March 9, 1937.    H. B. HULL    2,073,106
REFRIGERATING APPARATUS
Filed May 21, 1935
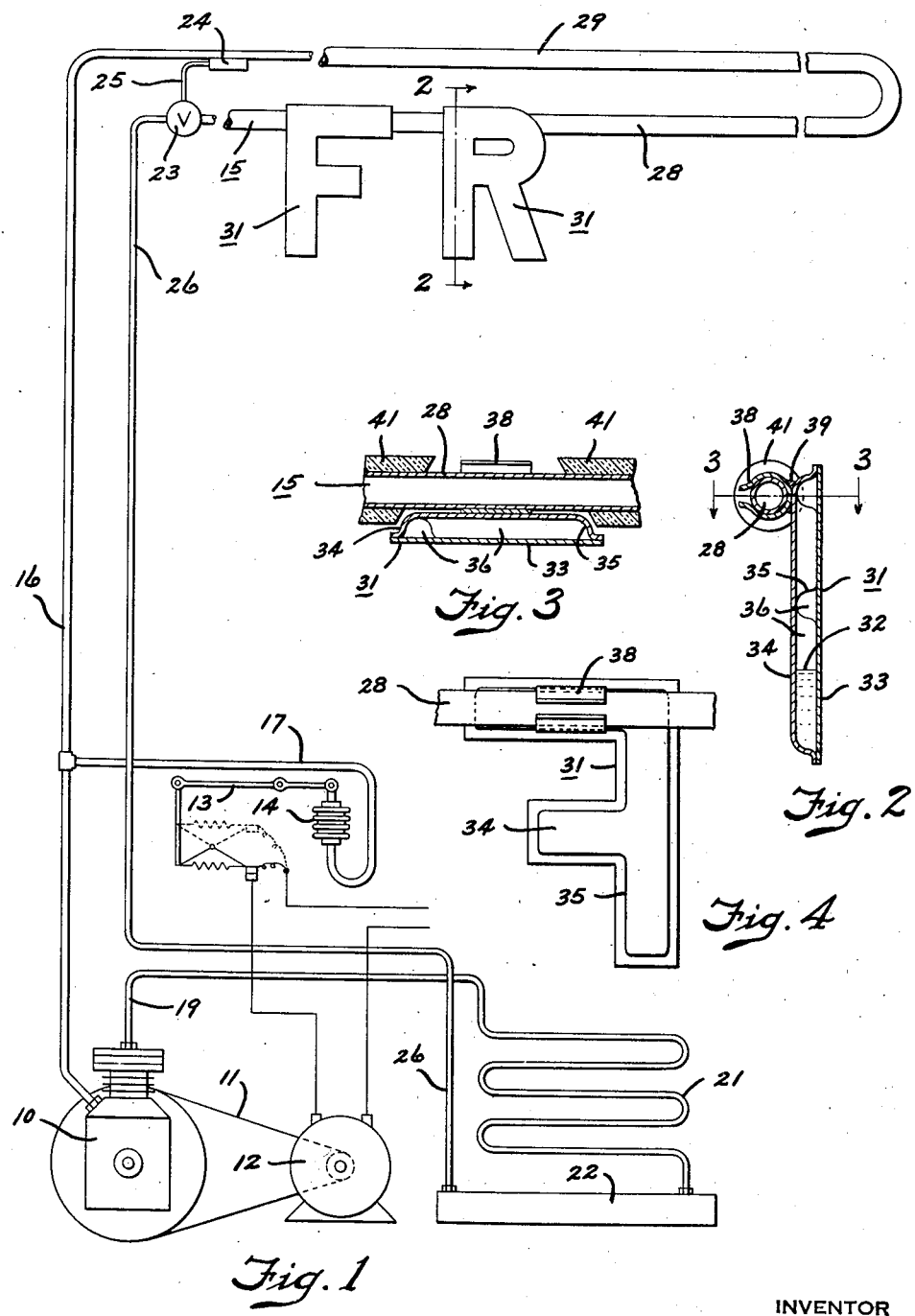
INVENTOR
HARRY B. HULL.
BY
Spencer, Hardman and Fehr.
HIS ATTORNEYS.

Patented Mar. 9, 1937

2,073,106

UNITED STATES PATENT OFFICE 2,073,106

REFRIGERATING APPARATUS

Harry B. Hull, Dayton, Ohio, assignor to General Motors Corporation, Dayton, Ohio, a corporation of Delaware Application May 21, 1935, Serial No. 22,551

16 Claims. (Cl. 62—1)

This invention relates to refrigeration and particularly to refrigerating systems suitable for use as advertising devices.

An object of my invention is to provide a novel advertising device or apparatus by utilizing the refrigerating effect produced by a cooling element or evaporator of a mechanical refrigerating apparatus.

Another object of my invention is to utilize the refrigerating effect produced by an evaporator of a refrigerating system to cool and condense a volatile fluid contained in a plurality of individually closed conduits or chambers attached in good thermal association with the evaporator to cause frost to form on the exterior walls of the closed conduits to provide an attractive advertising apparatus.

In carrying out the foregoing objects it is a still further object of my invention to form the closed conduits which contain the volatile fluid so that their contour represents a certain character, insignia, letter or number of a legend and to detachably secure each of the individual conduits to an evaporator of a refrigerating system so that certain conduits may be removed and replaced by certain other conduits to change the legend of the display or advertising apparatus.

Further objects and advantages of the present invention will be apparent from the following description, reference being had to the accompanying drawing, wherein a preferred form of the present invention is clearly shown.

In the drawing:

Fig. 1 is a diagrammatic showing of a refrigerating system employed in the construction of an advertising apparatus made in accordance with the present invention;

Fig. 2 is a vertical sectional view taken on the line 2—2 of Fig. 1 through one of the character-forming conduits shown therein;

Fig. 3 is a sectional view taken on the line 3—3 of Fig. 2; and

Fig. 4 is an elevational rear view of one of the character-forming members.

I am aware that others have formed the refrigerant expansion conduit or pipe of an evaporator of a refrigerating system to represent a legend and have utilized the cooling effect produced by the evaporator to cause frost or ice to accumulate on the evaporator to render the legend attractive as an advertising apparatus or device. The legend of an advertising device formed in this manner is an integral part of the refrigerating system or at least of the evaporator thereof and the legend cannot be removed and replaced by other legends without removing the evaporator. This obviously requires considerable time and labor on the part of one skilled in the refrigerating art. My invention is directed to the provision of an advertising device of the type which is rendered attractive by the refrigerating effect produced by an evaporator of a refrigerating system which can have its entire legend or certain characters of the legend readily changed without employing a refrigeration service man.

Referring to the drawing, for the purpose of illustrating my invention, I have shown diagrammatically in Fig. 1 thereof a closed volatile refrigerating medium circulating system. Any suitable and well-known refrigerating system may be employed in carrying out my invention and I have disclosed one form of conventional system. The refrigerating system herein disclosed includes a refrigerant liquefying and circulating unit comprising a compressor 10 which is operated by being connected, through belt and pulley connections 11, to an electric motor 12. Operations of motor 12 are controlled by any suitable or conventional electric snap acting switch 13. Switch 13 is in the present disclosure actuated into a circuit making or breaking position by expansion or contraction of a bellows 14 in response to pressures within the low pressure side of the refrigerating system. Operation of the compressor 10 causes same to withdraw vaporized refrigerant from an evaporator 15 through the gaseous refrigerant pipe or conduit 16 which has a branch conduit 17 connected to the bellows 14. The vaporized refrigerant is compressed by compressor 10 and forwarded under pressure, through pipe 19, to a condenser 21 wherein it is cooled and liquefied in any well-known manner. Liquefied refrigerant flows from condenser 21 into a receiver or reservoir 22 where it is stored prior to its being circulated to the evaporator 15. Any suitable or conventional design of expansion valve may be employed for controlling the ingress of liquid refrigerant to the evaporator. In the present disclosure the expansion valve 23 is connected to a thermostat bulb 24 having a pipe connection 25 with the valve 23. The bulb 24 and pipe 25 are partially filled with a volatile fluid and the temperature at the outlet of the evaporator 15 affects the volatile fluid in bulb 24 and pipe 25 to cause expansion or contraction thereof and consequently movement of a diaphragm or bellows contained in the valve 23 to open or close the valve for controlling the flow of liquid refrigerant through the liquid line 26 from reservoir 22 to evaporator 15. The temperature of the evaporator 15 may therefore be maintained between predetermined limits in accordance with the amount of refrigeration to be produced by the evaporator or cooling element. The refrigerant liquefying and circulating unit is intermittently operated independently of the operation of expansion valve 23 and in accordance with the pressure of refrigerant in the pipe line 16 to supply liquid refrigerant to receiver 22

The evaporator or cooling element 15 is in the present disclosure in the form of a pipe loop having a horizontally disposed portion 28 connected to valve 23 and another portion 29 connected to the gaseous refrigerant return pipe 16. Refrigerant flows from valve 23 into the portion 28 of evaporator 15 and this portion of the evaporator is therefore the coldest part thereof. The refrigerating effect produced by the evaporator 15 is of course to be maintained below the temperature of the atmosphere or below the temperature of the room or window in which the evaporator is located. In utilizing the refrigerating effect produced by the evaporator 15 for making an attractive and novel advertising device in accordance with the invention I secure a plurality of individually closed conduits or chamber members 31, each partially filled with the volatile liquid designated by the reference character 32 in Fig. 2, to and in intimate thermal association or contact with the pipe portion 28 of the evaporator 15. Each member 31 comprises a flat sheet metal portion 33 placed upon and secured to a substantially flat corrugated sheet metal portion 34 (see Figs. 2, 3 and 4). The sheet metal portion 34 of each member 31 is corrugated as at 35 to provide a passage or conduit 36 between the metal portions 33 and 34 of a contour (see Fig. 4) to represent a certain character such as a letter, number or any other insignia. The boundaries of the sheet metal portion 33, which form the front of members 31, are cut or fashioned to correspond with the contour of the conduit or passage 36 formed by the corrugation 35 in the sheet metal portion 34. In the present disclosure the members 31 represent or define the letters "F" and "R" and it is to be understood that any number of these members may be provided and may represent any number of a plurality of letters or numbers to form any desired legend, word or words. The members 31 are each provided with a metallic spring clip 38 which clip is welded or otherwise secured to the sheet metal portion 34 as at 39. The spring clip 38 is preferably in the form of a U so as to be capable of being snapped over the pipe 28 into tight and intimate thermal contact with this pipe portion of the evaporator 15. The spring clip 38 provides a means for readily attaching members 31 to, or for removing the members 31 from, the pipe 28 to enable certain of the letters of the legend or the entire legend to be changed. Portions of pipe 28 of evaporator 15 may be insulated by any suitable insulating material 41 (see Fig. 3) so as to prevent those portions of pipe 28 between various characters or members 31 of the legend from becoming coated with frost or ice to thereby prevent pipe 28 from obstructing the appearance of the characters of the legend to be displayed. The insulation 41 will, of course, be terminated at predetermined points along the length of pipe 28 to permit the spring clips 38 on the various character members 31 to be directly attached to the refrigerant expansion pipe 28. The pipe portion 29 of evaporator 15 may be extended beyond the legend to be displayed but is in the present disclosure preferably positioned in the same horizontal plane with pipe portion 28 and in back of this pipe portion 28 so as not to obstruct the legend formed by the character members 31. The pipe portion 29 of evaporator 15 may, if desired, be covered with the insulating material 41. It may also be desirable to cover the back sheet metal portion 34 of the character members 31 with the insulation 41 so as to insure complete frosting of the front of the characters formed by the closed conduit members 31.

Operation of the refrigerant liquefying and circulating unit of the refrigerating system causes refrigerant to be circulated through evaporator 15 and the expansion and vaporization of the refrigerant therein produces a refrigerating effect or a temperature on the outer walls of the evaporator below that of the atmosphere or below the temperature of the room or display window in which the evaporator is located. This low temperature is conducted by pipe portion 28 of evaporator 15 through the metallic spring clip 38 to the metal of the member 31. The volatile fluid 32 in the closed conduit character members 31 being in a vaporized state prior to the starting operation of the refrigerating system is then cooled and condensed or liquefied in the upper portion of the conduit or passage 36 of members 31. The condensed or liquefied fluid 32 flows to the bottom portion of members 31 and is again vaporized by the environment temperature surrounding these members in its effort to cool at least the front wall of the closed conduit members. Continued evaporation and condensation of the volatile fluid 32 in members 31 causes the members to be reduced to a low temperature whereby frost or ice accumulates, in the form of snow, on walls of the members 31. The members 31 are thereby rendered attractive in displaying certain letters or words of the legend formed by a plurality of the individually closed conduit character members.

It will be seen that I have provided an improved display device or apparatus wherein certain characters or letters of a legend may be readily removed from and replaced on the evaporator of a refrigerating system to change the legent or wherein all of the characters of the legend may be readily removed to provide a different legend. The legend of my improved display apparatus can be readily and easily changed without interrupting the operation of the refrigerating system and without removing the evaporator from the system to thereby permit such legends to be changed by the owner or user of the advertising device without the necessity of calling a refrigeration service man.

While the form of embodiment of the invention as herein disclosed, constitutes a preferred form, it is to be understood that other forms might be adopted, all coming within the scope of the claims which follow.

What is claimed is as follows:

1. A refrigerating apparatus comprising in combination, a closed refrigerating medium circuit including a cooling element and means for circulating a refrigerating medium through the element to cause same to produce a refrigerating effect, a closed conduit partially filled with a volatile liquid and secured in intimate thermal association with said cooling element, and said conduit having the contour of a certain character.

2. A refrigerating apparatus comprising in combination, a closed refrigerating medium circuit including a cooling element and means for circulating a refrigerating medium through the element to cause same to produce a refrigerating effect, a closed conduit partially filled with a volatile liquid and detachably secured in intimate thermal association with said cooling element, and said conduit having the contour of a certain character.

3. A refrigerating apparatus comprising in combination, a closed refrigerating medium circuit including a cooling element and means for circulating a refrigerating medium through the element to cause same to produce a refrigerating effect, a plurality of individually closed conduits each partially filled with a volatile liquid and secured in intimate thermal association with said cooling element, and each of said conduits having the contour of certain characters of a legend.

4. A refrigerating apparatus comprising in combination, a closed refrigerating medium circuit including a cooling element and means for circulating a refrigerating medium through the element to cause same to produce a refrigerating effect, a plurality of individually closed conduits each partially filled with a volatile liquid and detachably secured in intimate thermal association with said cooling element, and each of said conduits having the contour of certain characters of a legend.

5. A refrigerating apparatus comprising in combination, a closed refrigerating medium circuit including a cooling element and means for circulating a refrigerating medium through the element to cause same to produce a refrigerating effect, sheet metal portions having certain parts thereof secured together and certain other parts thereof spaced apart to form a closed conduit member said closed conduit member being partially filled with a volatile liquid and having the contour of a certain character, and means for securing said conduit member in intimate thermal association with said cooling element.

6. A refrigerating apparatus comprising in combination, a closed refrigerating medium circuit including a cooling element and means for circulating a refrigerating medium through the element to cause same to produce a refrigerating effect, sheet metal portions having certain parts thereof secured together and certain other parts thereof spaced apart to form a closed conduit member, said closed conduit member being partially filled with a volatile liquid and having the contour of a certain character, and means for detachably securing said conduit member in intimate thermal association with said cooling element.

7. A refrigerating apparatus comprising in combination, a closed refrigerating medium circuit including a cooling element and means for circulating a refrigerating medium through the element to cause same to produce a refrigerating effect, sheet metal portions having certain parts thereof secured together and certain other parts thereof spaced apart to form a closed conduit member, said closed conduit member being partially filled with a volatile liquid and having the contour of a certain character, and means on said conduit member for detachably securing same in intimate thermal association with said cooling element.

8. A refrigerating apparatus comprising in combination, a closed refrigerating medium circuit including a cooling element and means for circulating a refrigerating medium through the element to cause same to produce a refrigerating effect, sheet metal portions having certain parts thereof secured together and certain other parts thereof spaced apart to form a closed conduit member, said closed conduit member being partially filled with a volatile liquid and having the contour of a certain character and a spring clip of good heat conducting material on said conduit member for detachably securing same in intimate thermal association with said cooling element.

9. A refrigerating apparatus comprising in combination, a closed refrigerating medium circuit including a cooling element and means for circulating a refrigerating medium through the element to cause same to produce a refrigerating effect, sheet metal portions having certain parts thereof secured together and certain other parts thereof spaced apart to form a closed conduit member, other sheet metal portions having certain parts thereof secured together and certain other parts thereof spaced apart to form another closed conduit member, said conduit members being separate from and independent of one another and each being partially filled with a volatile liquid, each of said conduit members having the contour of certain characters of a legend, and means for securing each of said members in intimate thermal association with said cooling element.

10. A refrigerating apparatus comprising in combination, a closed refrigerating medium circuit including a cooling element and means for circulating a refrigerating medium through the element to cause same to produce a refrigerating effect, sheet metal portions having certain parts thereof secured together and certain other parts thereof spaced apart to form a closed conduit member, other sheet metal portions having certain parts thereof secured together and certain other parts thereof spaced apart to form another closed conduit member, said conduit members being separate from and independent of one another and each being partially filled with a volatile liquid, each of said conduit members having the contour of certain characters of a legend, and means for detachably securing each of said members in intimate thermal association with said cooling element.

11. A refrigerating apparatus comprising in combination, a closed refrigerating medium circuit including a cooling element and means for circulating a refrigerating medium through the element to cause same to produce a refrigerating effect, sheet metal portions having certain parts thereof secured together and certain other parts thereof spaced apart to form a closed conduit member, other sheet metal portions having certain parts thereof secured together and certain other parts thereof spaced apart to form another closed conduit member, said conduit members being separate from and independent of one another and each being partially filled with a volatile liquid, each of said conduit members having the contour of certain characters of a legend, and means on each of said members for detachably securing the independent members in intimate thermal association with said cooling element.

12. A refrigerating apparatus comprising in combination, a closed refrigerating medium circuit including a cooling element and means for circulating a refrigerating medium through the element to cause same to produce a refrigerating effect, sheet metal portions having certain parts thereof secured together and certain other parts thereof spaced apart to form a closed conduit member, other sheet metal portions having certain parts thereof secured together and certain other parts thereof spaced apart to form another closed conduit member, said conduit members being separate from and independent of one another and each being partially filled with a volatile liquid, each of said conduit members having the contour of certain characters of a legend, and a spring clip of good heat conducting material on each of said members for detachably securing the independent members in intimate thermal association with said cooling element.

13. A refrigerating apparatus comprising in combination, a closed refrigerating medium circuit including a cooling element and means for circulating a refrigerating medium through the element to cause same to produce a refrigerating effect, a closed passage or chamber detachably secured in intimate thermal association with said cooling element, said closed passage or chamber having the contour of a certain character to be displayed, and a refrigerating fluid within said closed passage or chamber for transmitting and distributing the refrigerating effect produced by said cooling element uniformly over certain exposed surfaces of said character.

14. A refrigerating apparatus comprising in combination, a closed refrigerating medium circuit including a cooling element and means for circulating refrigerating medium through the element to cause same to produce a refrigerating effect, a closed passage or chamber detachably secured in intimate thermal association with said cooling element, said closed passage or chamber having the contour of a certain character to be displayed, a refrigerating fluid within said closed passage or chamber for transmitting and distributing the refrigerating effect produced by said cooling element uniformly over certain exposed surfaces of said character, and means for insulating portions of said cooling element beyond said character to prevent the refrigerating effect produced in the cooling element from causing frost to accumulate thereon.

15. A refrigerating apparatus comprising in combination, a closed refrigerating medium circuit including a cooling element and means for circulating a refrigerating medium through the element to cause same to produce a refrigerating effect, a plurality of individually closed passages or chambers detachably secured in intimate thermal association with said cooling element, each of said closed passages or chambers having the contour of certain characters of a legend to be displayed, and a refrigerating fluid within each of said closed passages or chambers for transmitting and distributing the refrigerating effect produced by said cooling element uniformly over certain exposed surfaces of said characters.

16. A refrigerating apparatus comprising in combination, a closed refrigerating medium circuit including a cooling element and means for circulating a refrigerating medium through the element to cause same to produce a refrigerating effect, a plurality of individually closed passages or chambers detachably secured in intimate thermal association with said cooling element, each of said closed passages or chambers having the contour of certain characters of a legend to be displayed, a refrigerating fluid within each of said closed passages or chambers for transmitting and distributing the refrigerating effect produced by said cooling element uniformly over certain exposed surfaces of said characters, and means for insulating portions of said cooling element beyond and between said characters to prevent the refrigerating effect produced in the cooling element from causing frost to accumulate thereon.

HARRY B. HULL.